(12) United States Patent
Takasu et al.

(10) Patent No.: US 10,490,801 B2
(45) Date of Patent: Nov. 26, 2019

(54) BATTERY PACK PROTECTION ELEMENT ATTACHMENT TAB, BATTERY PACK PARALLEL FIXING COMPONENT, AND BATTERY PACK

(71) Applicant: FDK CORPORATION, Tokyo (JP)

(72) Inventors: Yukitomo Takasu, Tokyo (JP); Makoto Sakaguchi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 15/940,987

(22) Filed: Mar. 30, 2018

(65) Prior Publication Data

US 2018/0226628 A1 Aug. 9, 2018

Related U.S. Application Data

(63) Continuation of application No. PCT/JP2016/073635, filed on Aug. 10, 2016.

(30) Foreign Application Priority Data

Sep. 30, 2015 (JP) .................................. 2015-195047
Oct. 8, 2015 (JP) .................................. 2015-200579

(51) Int. Cl.
*H01M 4/02* (2006.01)
*H01M 2/34* (2006.01)
(Continued)

(52) U.S. Cl.
CPC .............. *H01M 2/34* (2013.01); *H01M 2/10* (2013.01); *H01M 2/105* (2013.01); *H01M 2/20* (2013.01);
(Continued)

(58) Field of Classification Search
CPC ...................................................... H01M 4/02
See application file for complete search history.

(56) References Cited

U.S. PATENT DOCUMENTS 4,217,400 A 8/1980 Leffingwell
4,315,364 A 2/1982 Leffingwell
(Continued)

FOREIGN PATENT DOCUMENTS

EP 2355205 A1 8/2011
JP S6179454 U 5/1986
(Continued)

OTHER PUBLICATIONS

International Search Report (ISR) for Application No. PCT/JP2016/073635 dated Oct. 4, 2016.
(Continued)

*Primary Examiner* — Jacob B Marks
(74) *Attorney, Agent, or Firm* — Isshiki international Law Office; Joseph P. Farrar, Esq.

(57) ABSTRACT

A protection element attachment tab made of a single flat metal plate and mounted on positive and negative electrode terminals of a cylindrical cell to connect between the positive electrode terminal formed on one end surface of the cell and the negative electrode terminal formed on another end surface of the cell with a protection element that prevents overdischarge between the electrode terminals. The protection element attachment tab includes a planar region facing the end surface when mounted on the electrode terminal; a first protrusion protruding from the planar region in a direction along the planar region, a leading end of the first protrusion protruding outward from the end surface of the cell when the planar region is mounted on the electrode terminal; and a second protrusion shorter than the first protrusion, protruding from the planar region in a direction different from the first protrusion along the planar region.

8 Claims, 16 Drawing Sheets

(51) Int. Cl.
*H01M 2/10* (2006.01)
*H01M 2/20* (2006.01)
*H01M 2/02* (2006.01)

(52) U.S. Cl.
CPC ............ *H01M 2/204* (2013.01); *H01M 2/022* (2013.01); *H01M 2/202* (2013.01); *H01M 2200/00* (2013.01); *H01M 2220/30* (2013.01)

(56) References Cited

U.S. PATENT DOCUMENTS

| | | |
|---|---|---|
| 2004/0115519 A1 | 6/2004 | Lee |
| 2009/0029242 A1 | 1/2009 | Hirakawa |
| 2011/0293998 A1 | 12/2011 | Sato et al. |
| 2012/0121936 A1 | 5/2012 | Baek et al. |
| 2014/0178723 A1 | 6/2014 | Tsujioka et al. |

FOREIGN PATENT DOCUMENTS

| | | |
|---|---|---|
| JP | S6179455 U | 5/1986 |
| JP | S6179457 U | 5/1986 |
| JP | H06223804 A | 8/1994 |
| JP | 2000340200 A | 12/2000 |
| JP | 2002245915 A | 8/2002 |
| JP | 2005520313 A | 7/2005 |
| JP | 2011154883 | 8/2011 |
| JP | 2011-253641 | * 12/2011 |
| JP | 2011253641 A | 12/2011 |
| JP | 2013114949 A | 6/2013 |
| WO | 2013021573 A1 | 2/2013 |

OTHER PUBLICATIONS

Translation of the ISR for Application No. PCT/JP2016/073635 dated Oct. 4, 2016.
Written Opinion of the International Search Authority for Application No. PCT/JP2016/073635 dated Oct. 4, 2016.
Partial translation of Written Opinion of the International Search Authority for Application No. PCT/JP2016/073635 dated Oct. 4, 2016.
The Extended European Search Report for Application No. 16850927.1 dated Feb. 7, 2019.
Japanese Office Action for Application No. 2015-195047 dated Aug. 16, 2019.
Translation of Japanese Office Action for Application No. 2015-195047 dated Aug. 16, 2019.
Japanese Office Action for Application No. 2015-200579 dated Aug. 16, 2019.
Translation of Japanese Office Action for Application No. 2015-200579 dated Aug. 16, 2019.

* cited by examiner

BATTERY PACK PROTECTION ELEMENT ATTACHMENT TAB, BATTERY PACK PARALLEL FIXING COMPONENT, AND BATTERY PACK

CROSS-REFERENCE TO RELATED APPLICATIONS

The present application is a continuation application of International Patent Application No. PCT/JP2016/073635 filed Aug. 10, 2016, which claims the benefit of priority to Japanese Patent Application No. 2015-195047, filed on Sep. 30, 2015 and Japanese Patent Application No. 2015-200579, filed on Oct. 8, 2015. The entire contents of these applications are incorporated herein by reference.

TECHNICAL FIELD

The present disclosure relates to a protection element attachment tab for connecting a protection element between positive and negative electrode terminals of each of a plurality of cylindrical cells arranged in parallel and constituting a battery pack, and a battery pack including the tab. Furthermore, the present disclosure relates to a parallel fixing component used for fixing a plurality of cylindrical cells arranged in parallel and constituting a battery pack, and a battery pack constituted using the parallel fixing component.

BACKGROUND ART

The battery pack is formed as a single unit by covering, with a jacket (hereinafter, also referred to as a jacket for battery pack) such as a heat-shrinkable tube, an assembled battery in which a plurality of cells is electrically connected in series or in parallel. Some battery packs are formed such that a plurality of cylindrical cells is disposed in parallel. FIG. 1 is an external view of a battery pack 91 in which an assembled battery formed by connecting three cylindrical cells (910L, 910M, 910R) disposed in parallel is covered with a battery pack jacket 920. FIG. 2A and FIG. 2B each illustrate an arrangement of the three cells (910L, 910M, 910R) constituting the assembled battery illustrated in FIG. 1 and an electrical connection between the cells (910L-910M, 910M-910R). Hereinafter, the respective cells 910L, 910M and 910R may also be referred to as the cell 910 where it is not necessary to distinguish between them.

As illustrated in FIG. 1, the battery pack 91 is collectively covered with the battery pack jacket 920 formed of a heat-shrinkable tube in a state in which the three cells (910L, 910M, 910R) are disposed in parallel. This maintains the arrangement of the cells (910L, 910M, 910R). FIG. 2A is a perspective view illustrating a body of the battery pack (hereinafter, also referred to as a battery pack body 92) excluding the battery pack jacket 920 from the battery pack 91 illustrated in FIG. 1. FIG. 2B illustrates a state of the battery pack body 92 in the battery pack jacket 920 and corresponds to a plan view when the battery pack 91 illustrated in FIG. 1 is seen from the end surfaces of the cylindrical cells (910L, 910M, 910R).

In the following, a configuration of the battery pack 91 will be described based on FIG. 2A and FIG. 2B. Here, an axial direction 100 of each cylindrical cell (910L, 910M, 910R) is referred to as an up-down direction, and the directions orthogonal to the up-down direction are a right-left direction and a front-back direction. Here, an arrangement direction of the cells (910L, 910M, 910R) is referred to as a right-left direction. Note that, each of the directions of "up-down", "right-left" and "front-back" is defined as shown in FIG. 2A and FIG. 2B. That is, FIG. 2A illustrates a perspective view when the battery pack body 92 is seen from a right front upper side, and FIG. 2B illustrates a plan view when the battery pack 91 is seen from above.

First, as illustrated in FIG. 2A and FIG. 2B, the three cells (910L, 910M, 910R) are disposed in parallel in the right-left direction. In this example, the three cells (910L, 910M, 910R) are electrically connected in series. Thus, the top and bottom ends of the adjacent cells (910L-910M, 910M-910R) are mutually inverted. Here, in both the right and left cells (910L, 910R), negative terminals 911 face upward, and in the central cell 910M, a positive terminal 912 faces upward (note that, the respective terminals are also collectively referred to as electrode terminals 911, 912 without distinguishing between the negative terminal 911 and the positive terminal 912). On the upper end of the battery pack body 92, the negative terminal 911 of the left end cell 910L and the positive terminal 912 of the central cell 910M are connected via a tab (hereinafter, also referred to as a connecting tab 930) made of a metal plate. On the lower end (not shown) of the battery pack body 92, the negative terminal 911 of the central cell 910M and the positive terminal 912 of the right end cell 910R are connected via another connecting tab 930 (not shown).

The connecting tab 930 is attached to the negative terminal 911 and the positive terminal 912, for example, by welding (spot welding). Furthermore, lead wires (hereinafter, also referred to as power supply lead wires 931) for supplying electric power to external devices are attached to the negative terminal 911 of the right end cell 910R and the positive terminal 912 (not shown) of the left end cell 910L via tabs 932 (hereinafter, also referred to as power supply lead tabs 932) different from the connecting tabs 930.

Further, an axial-type protection element (such as a diode) 940 for preventing overdischarge is connected between the positive terminal 912 and the negative terminal 911 of each cell (910L, 910M, 910R). The protection element 940 is configured such that lead wires (hereinafter, also referred to as element lead wires 942) are guided from both the upper and lower ends of its body 941 along the up-down direction, and leading ends of the element lead wires 942 are connected to the positive terminal 912 and the negative terminal 911, respectively, via the connecting tabs 930 or a dedicated tab 933 (hereinafter, also referred to as an element tab 933). Here, the element lead wires 942 and the power supply lead wires 931 are each connected to the corresponding tabs (930, 932, 933) by solder 934.

Note that the three cells (910L, 910M, 910R) disposed in parallel are held together by insulating adhesive tape 93 to maintain this arrangement. Accordingly, workability when the tabs (930, 932, 933) and the power supply lead wires 931 are attached before the battery pack jacket 920 is attached can be secured, and the element lead wires 942 of the protection element 940 are kept from contact with the battery can which also serves as one of the positive or negative electrodes, so as not to cause an external short-circuit. In order to further reliably prevent the short-circuit, an insulator (insulating tape 94 and a ring-shaped insulator 95 described later) such as adhesive tape is disposed in a region along the element lead wires 942 on the side surface of each cell (910L, 910M, 910R), or on a border between the end surface and side surface of each cylindrical cell (910L, 910M, 910R) and in its vicinity region or the like, as needed.

Furthermore, since the battery can of each cell (910L, 910M, 910R) serves as one of the positive and negative electrodes, the cells (910L, 910M, 910R) themselves are also covered with a cell jacket (not shown). In this example, in addition to the adhesive tape 93, strip-shaped insulating tape 94 extending in a direction along the element lead wires 942 of the protection element 940 is bridged across the side surfaces of adjacent cells (910L-910M, 910M-910R). This prevents short-circuiting as described above, and for example, when the element lead wires 942 generate heat, the cell jacket (not shown) of each cell (910L, 910M, 910R) is prevented from being torn by the heat so that a short-circuit does not occur due to contact of the element lead wires 942 with the battery can. Further, since there is a possibility that the cell jacket (not shown) near the border between the end surface and side surface of each cylindrical cell (910L, 910M, 910R) may be torn by an edge of the connecting tab 930 that bridges the negative terminal 911 and the positive terminal 912 of the adjacent cells (910L-910M, 910M-910R) and a short-circuit caused thereby, a ring-shaped insulator 95 is disposed on the edges between cells (910L-910M, 910M-910R). In this example, the ring-shaped insulator 95 is disposed on the end surface where the projecting positive terminal 912 is located.

When the battery pack body 92 illustrated in FIG. 2A is covered with the battery pack jacket 920 formed of a heat-shrinkable tube, the external shape thereof is more firmly maintained, and the battery pack 91 illustrated in FIG. 1 and FIG. 2B is completed. It should be noted that the configuration of the battery pack is described, for example, in Japanese Unexamined Patent Application Publication No. 2000-340200.

As described above, in the battery pack 91 formed as a single unit by disposing a plurality of cylindrical cells 910 in parallel, when the axial-type protection element 940 is attached, a process of bending the element lead wires 942 of the protection element 940 is required. The protection element 940 has a configuration in which the element lead wires 942 are guided to both ends of the tube-shaped element body 941, and the leading ends of the element lead wires 942 are soldered via the tabs (930, 933) on the end surfaces where the positive terminal 912 or the negative terminal 911 of the cell 910 is disposed. In other words, each element lead wire 942 is bent in the middle of its extension in a direction along the side surface from the end surface of the cell 910. Accordingly, unless the bending shape of each element lead wire 942 and accuracy when the leading ends of the element lead wires 942 are attached to the tabs (930, 933) are strictly managed, a displacement occurs in the attachment position of the protection element 940 and the arrangement of the element body 941. Accordingly, the displacement of the protection element 940 leads to unevenness in external shape and dimension of the battery pack 91. Further, it is necessary to attach the tabs (933, 932) and the connecting tab 930 corresponding to the protection element 940 and the power supply lead wire 931 respectively to the areas of the electrode terminals (911, 912) of the cell 910 which are limited and narrow, and it is difficult to attach a plurality of tabs (930, 932, 933) to one electrode terminal (911, 912) depending on the size of the cylindrical cell 910. Needless to say, the tabs (933, 932) corresponding to the respective element lead wires 942 and the power supply lead wires 931 are required, thus increasing the number of parts. In addition, processes for attaching the respective tabs (933, 932) are also required separately. For this reason, it becomes difficult to reduce manufacturing cost of the battery pack 91.

As described above, the battery pack 91 formed as a single unit by disposing the plurality of cylindrical cells 910 in parallel separately needs a process of winding adhesive tape 93 around the assembled battery constituted by the plurality of cells 910 in the manufacturing process. Even though the adhesive tape 93 positions the cells in place, it is impossible to firmly fix the shape of the cell 910 with the adhesive tape 93, and thus the relative positions of the cells 90 may be displaced due to vibration and impact in subsequent manufacturing processes such as attaching the various tabs (930, 932, 933). If the battery pack 91 is completed in a state in which the positional relationship of the cells 910 is displaced, there is a possibility that this may cause unevenness in external dimension of the battery pack 91, and the battery pack 91 cannot be placed in an electronic device that uses the battery pack 91. On the other hand, if the adhesive tape 93 is tightly wound around the assembled battery to prevent displacement, the adhesive tape 93 is linearly bridged across the V-shaped groove areas, and thus it becomes impossible to place the protection elements 940 into the V-shaped groove areas. Accordingly, when the battery pack body 92 is covered with the battery pack jacket 920, the protection element 940 protrudes markedly from the outer periphery of the battery pack 91. That is, the external shape of the battery pack 91 becomes unnecessarily large.

Moreover, in the battery pack 91, the insulating tape 94 and the ring-shaped insulator 95 are attached in order to protect a cell jacket (not shown) of the cell 910 from the element lead wires 942 of the axial-type protection element 940 and the edge of the connecting tab 930. Thus, it has been difficult to inexpensively provide the battery pack 91 due to the cost related to these members 94, 95 and the process of attaching these members 94, 95.

In view of the aforementioned problems, an objective of the present disclosure is to provide an inexpensive battery pack with no variation in external dimension while securing dimensional accuracy of the battery pack and reducing manufacturing cost by decreasing the number of processes and parts.

SUMMARY

This patent specification describes a protection element attachment tab made of a single flat metal plate, the protection element attachment tab being mounted on each of positive and negative electrode terminals of a cylindrical cell to connect between the positive electrode terminal formed on one end surface of the cell and the negative electrode terminal formed on another end surface of the cell with a protection element that prevents overdischarge between the electrode terminals, the protection element attachment tab including: a planar region facing the end surface of the cell when mounted on the electrode terminal of the cell; a first protrusion protruding from the planar region in a direction along the planar region and having a length so that a leading end of the first protrusion protrudes outward from the end surface of the cell when the planar region is mounted on the electrode terminal; and a second protrusion protruding from the planar region in a direction different from the first protrusion along the planar region and being shorter than the first protrusion.

DESCRIPTION OF EMBODIMENTS

Figure 1:
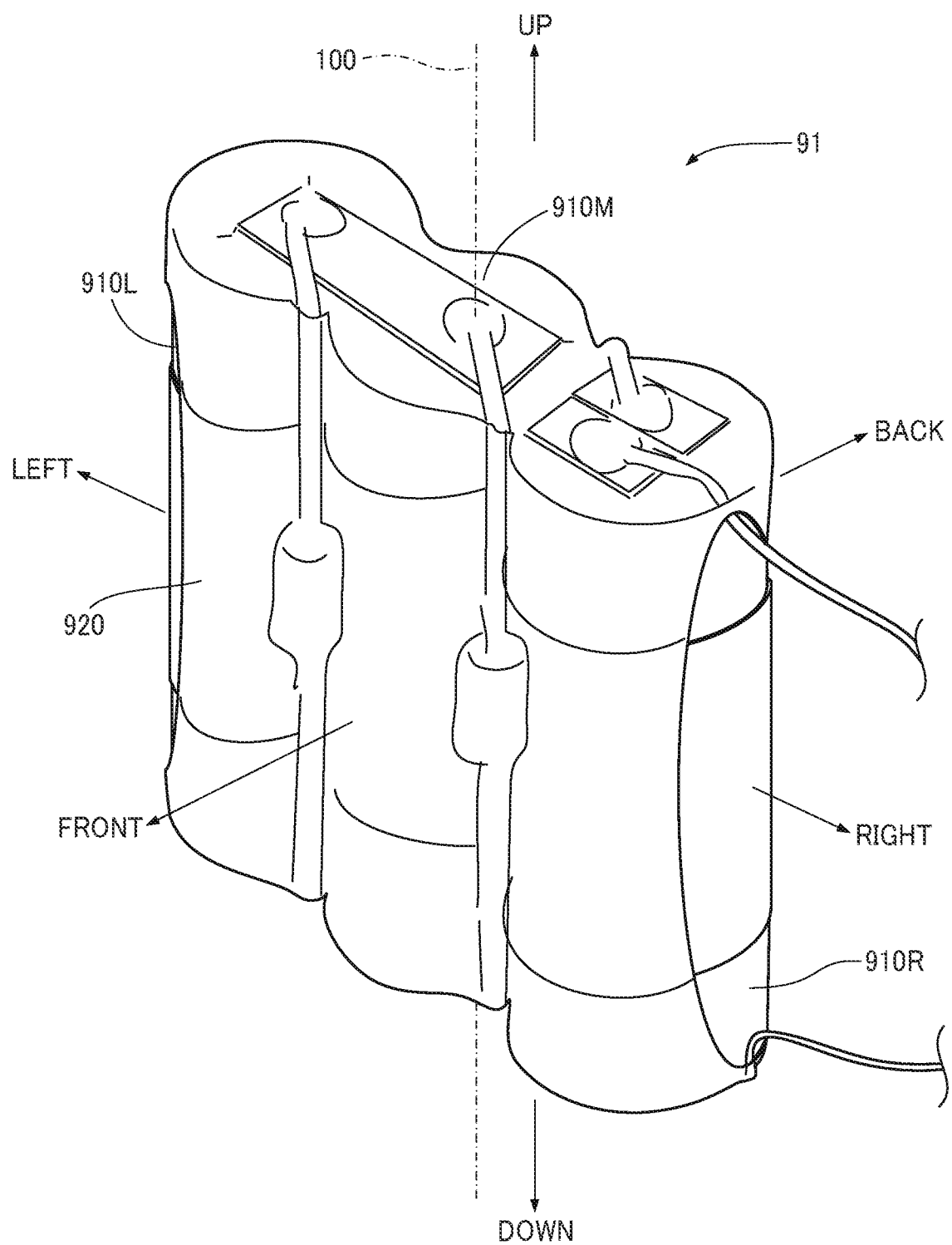
FIG. 1 illustrates an appearance of a battery pack.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a battery pack protection element attachment tab, battery pack parallel fixing component, and battery pack according to embodiments of the present disclosure are described. As used herein, the singular forms "a", "an", and "the" are intended to include the plural forms as well, unless the context clearly indicates otherwise.

First Embodiment

===Protection Element Attachment Tab===

Figure 3:
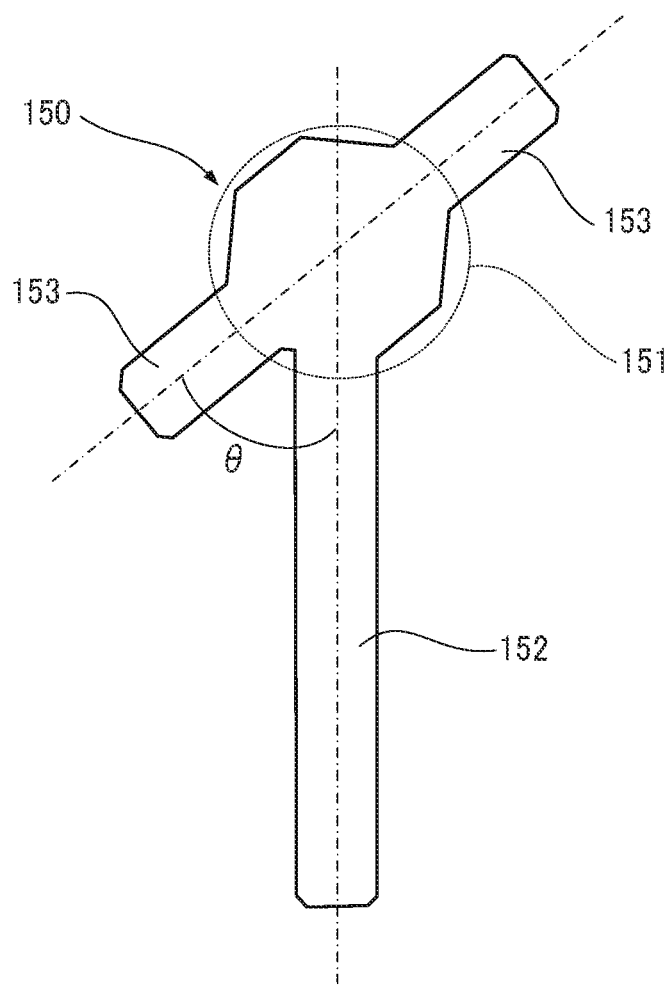
FIG. 3 illustrates a planar shape of a protection element attachment tab associated with a working example of a first embodiment in the present disclosure.

FIG. 3 illustrates a planar shape of a protection element attachment tab (hereinafter, also referred to as an element tab 150) associated with a working example of a first embodiment in the present disclosure. The element tab 150 is made of a single flat metal plate, and includes a plurality of protrusions (152, 153) with respect to a planar region (hereinafter, also referred to as an attachment part 151) that is each attached to the electrode terminals (911, 912) of the cell 910 by welding or the like. In the illustrated element tab 150, the attachment part 151 has a hexagonal planar shape. Also, a long protrusion (hereinafter, referred to as a first protrusion 152) and short protrusions (hereinafter, second protrusions 153) protrude from the attachment part 151. Note that, the second protrusions 153 protrude in mutually opposite directions with respect to the attachment part 151, and the first protrusion 152 protrudes in a direction intersecting with one of the second protrusions 153 at a predetermined angle θ.

===Battery Pack===

Figure 2A:
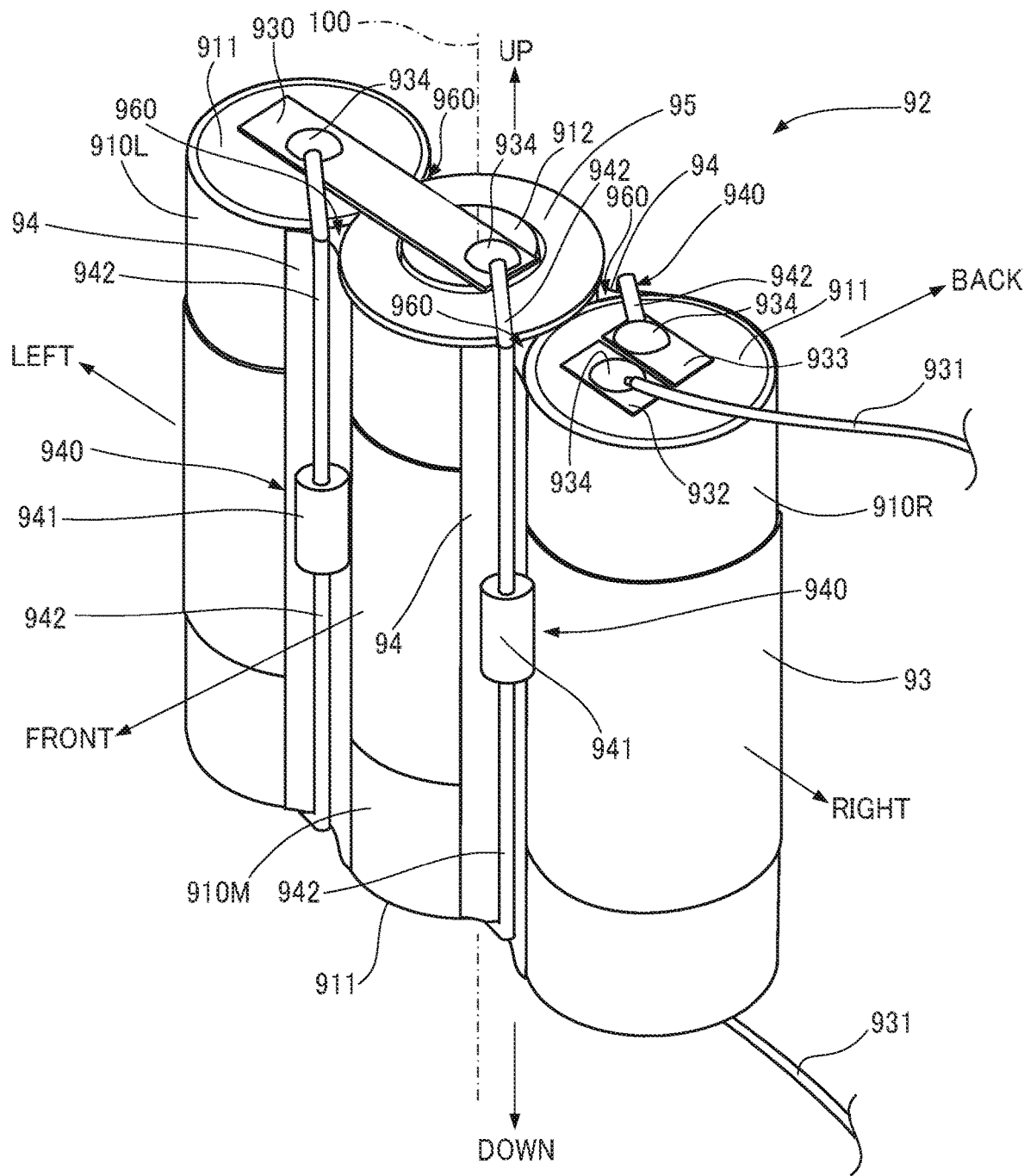
FIG. 2A illustrates a configuration of the battery pack.
Figure 2B:
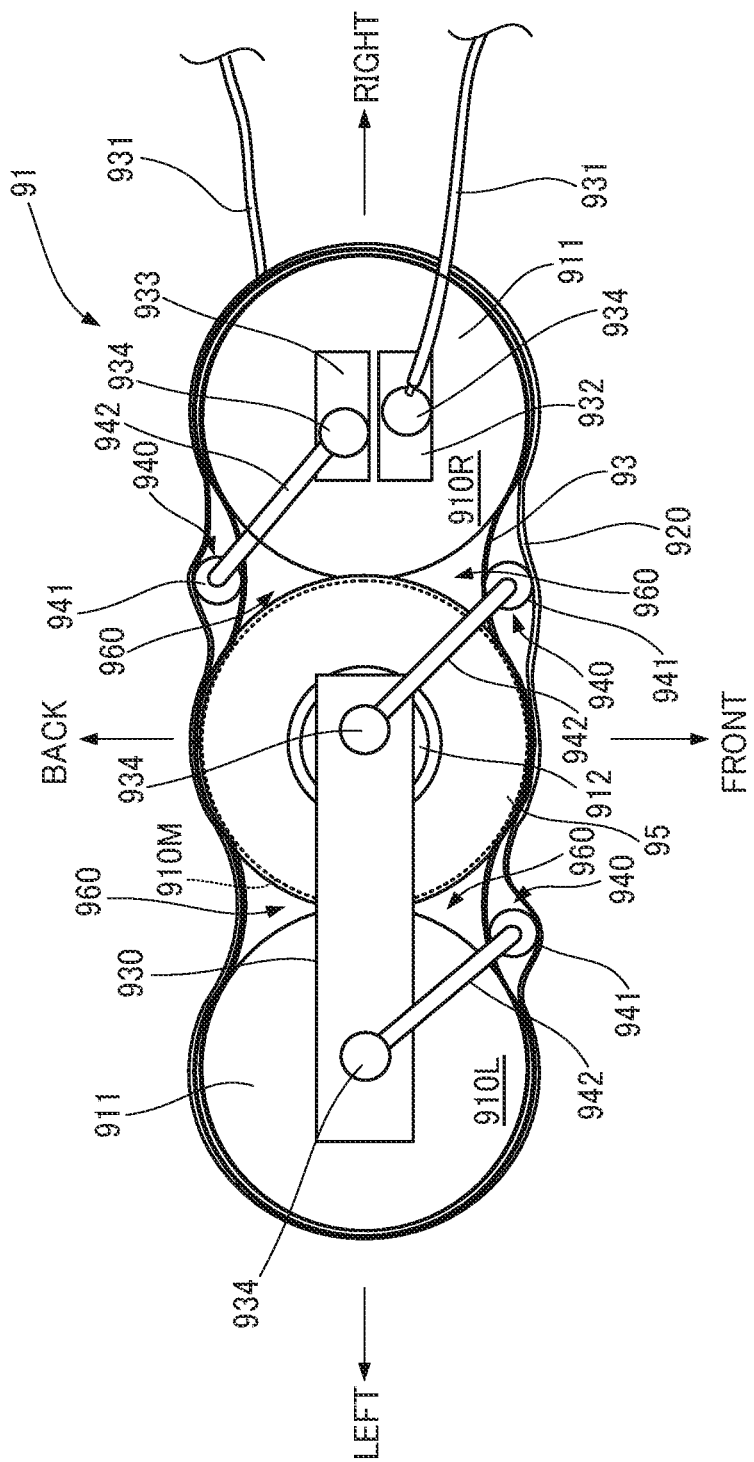
FIG. 2B illustrates a configuration of the battery pack.
Figure 4A:
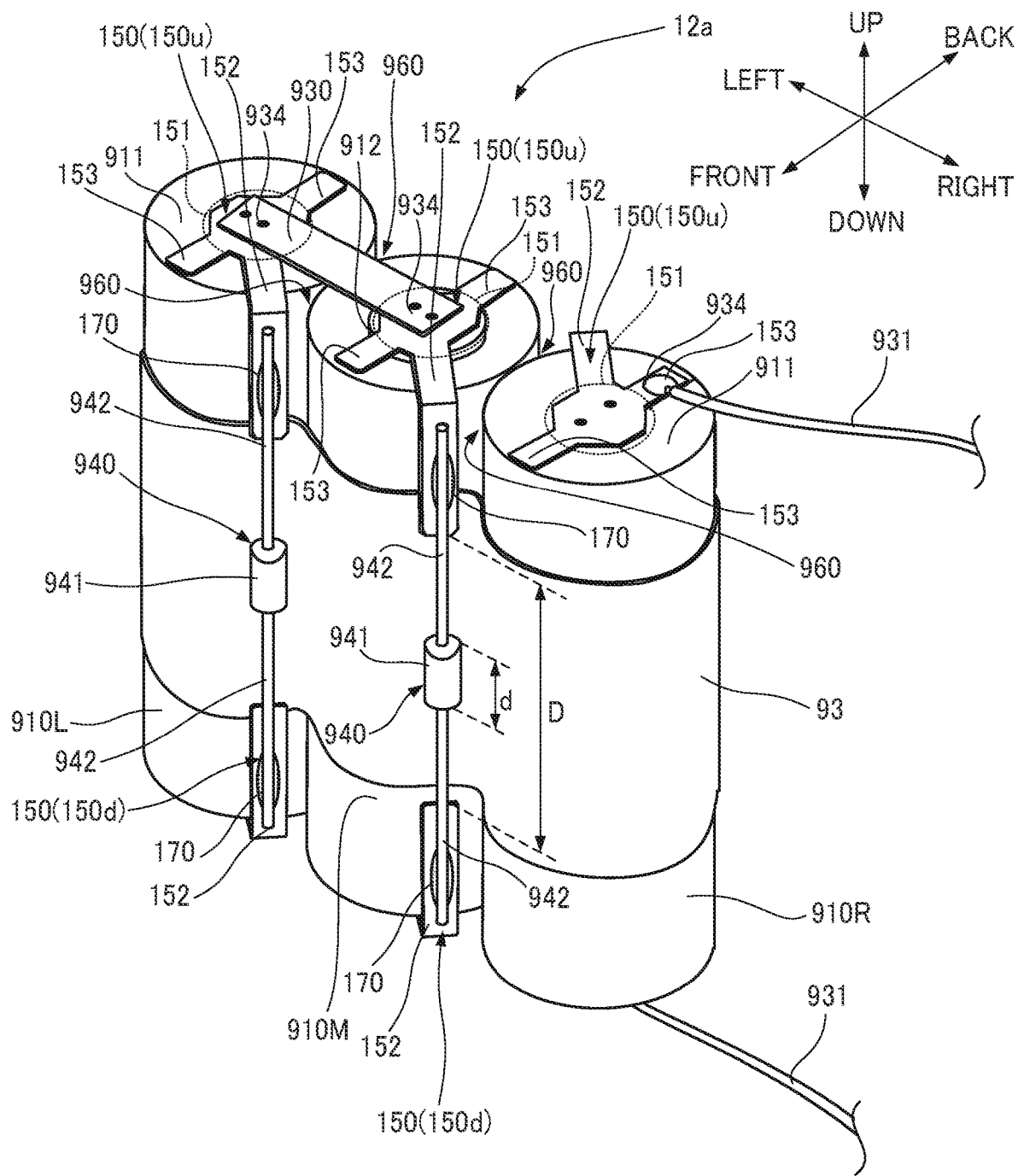
FIG. 4A illustrates a configuration of the battery pack associated with the working example of the first embodiment in the present disclosure using the aforementioned protection element attachment tab.
Figure 4B:
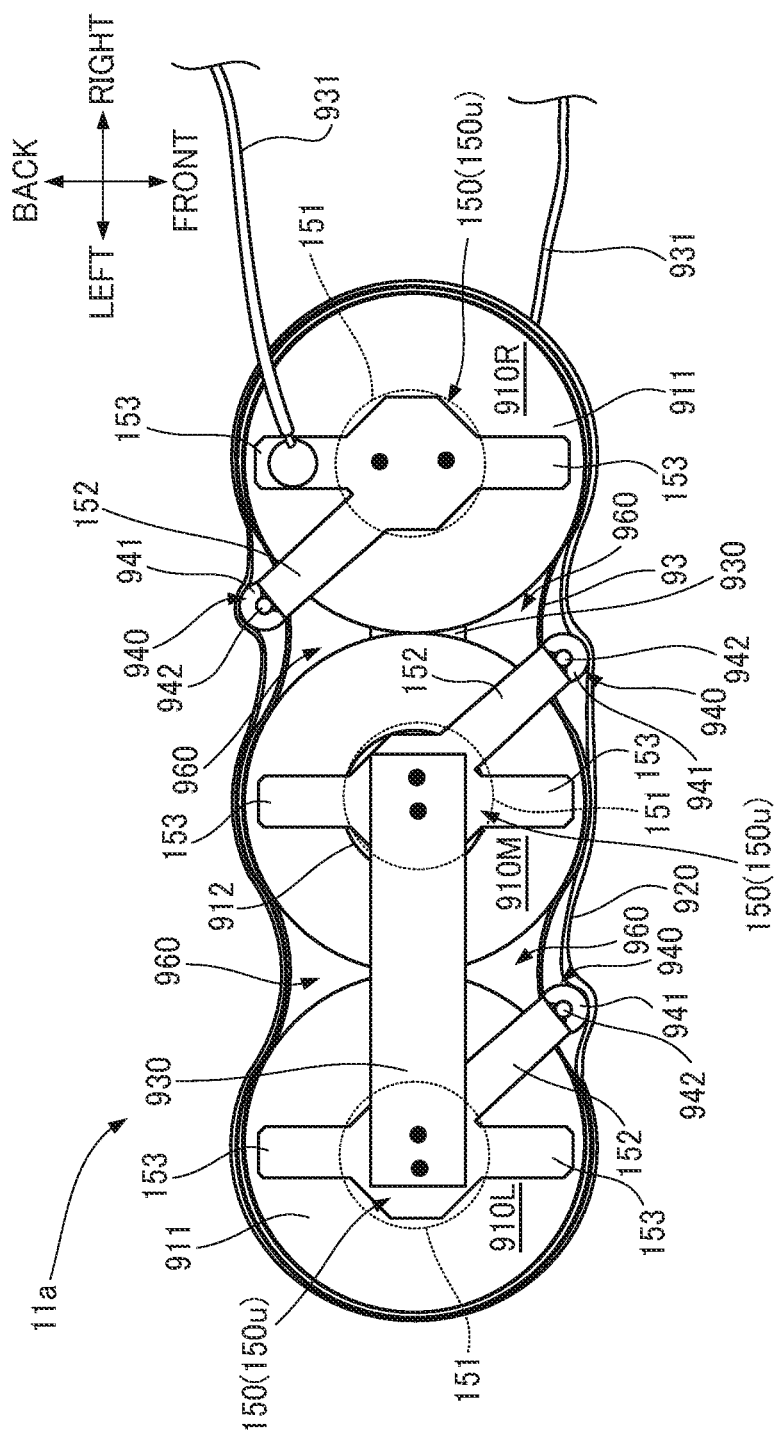
FIG. 4B illustrates a configuration of the battery pack associated with the working example of the first embodiment in the present disclosure using the aforementioned protection element attachment tab.

The battery back associated with the working example of the first embodiment in the present disclosure is configured such that protection elements 940 are attached to the respective electrode terminals (911, 912) of the plurality of cells 910 via the aforementioned element tabs 150, and the protection elements 940 are covered with a battery pack jacket 920 together with the cells 910. FIG. 4A and FIG. 4B each illustrate a battery pack 11a associated with the working example of the first embodiment in the present disclosure. Here, when the directions of "up-down", "right-left" and "front-back" illustrated in FIG. 1, FIG. 2A and FIG. 2B are employed, FIG. 4A is a perspective view when a battery pack body 12a excluding the battery pack jacket 920 from the battery pack 11a is seen from a right front upper side. FIG. 4B is a plan view when the battery pack 11a is seen from above. As illustrated in FIG. 4A, each element tab 150 is attached such that the second protrusions 153 extend in the front-back direction. Here, each element tab 150 is attached such that the center of the attachment part 151 and the center of the end surface of each cell (910L, 910M, 910R) match with each other. Further, a pair of element tabs (150u-150d) attached to both the upper and lower electrode terminals (911, 912) of the cells (910L, 910M, 910R) faces each other so that their planar shapes are vertically symmetrical with each other. Then, as also illustrated in FIG. 4B, each of the first protrusions 152 extends toward a V-shaped groove area 960 between the adjacent cells (910L-910M, 910M-910R), and is bent in the middle of its extension in a direction along the side surface of each cell (910L, 910M, 910R). In a pair of element tabs (150u, 150d) that faces each other in the up-down direction in one cell (910L, 910M, 910R), the first protrusions (152-152) that extend along the respective cells (910L, 910M, 910R) extend, and the respective leading ends thereof face each other across a gap. The vertical length D of this gap is larger than the vertical length d of the body 941 of the protection element 940, and the body 941 of the protection element 940 is disposed in the gap. Each element lead wire 942 is attached to an area from the bending position to the leading end of the first protrusion 152 by soldering, welding or the like. In this example, each element lead wire 942 is soldered to the first protrusion 152 in an area 170 illustrated by dots in FIG. 4A. Accordingly, in the battery pack 11a associated with the present working example, the element lead wires 942 of the protection element 940 can be connected between the positive and negative electrode terminals (911-912) of the respective cells (910L, 910M, 910R) without being bent.

In the battery pack 11a illustrated here, the three cells (910L, 910M, 910R) are electrically connected in series, and the electrode terminals (911, 912) of the left end cell 910L and the central cell 910M are connected by a flat, rectangular connecting tab 930 on the upper surface side. On the lower surface side which is not illustrated, the electrode terminals of the central cell 910M and the right end cell 910R are connected by the similar connecting tab 930. The connecting tab 930 is stacked on the element tabs 150 of the adjacent cells (910L-910M, 910M-910R) and is attached in a state of being bridged across the attachment parts (151-151) of the adjacent element tabs 150. Needless to say, the element tab 150 may be stacked on the connecting tab 930. Furthermore, in the electrode terminals (912, 911) that correspond to the respective positive electrodes and the negative electrodes of the assembled battery made by electrically connecting the three cells (910L, 910M, 910R), power supply lead wires 931 are attached to the second protrusions 153 of the element tabs 150.

When the battery pack body 12a illustrated in FIG. 4A is covered with the battery pack jacket 920 made of a heat-shrinkable tube, each protection element 940 is disposed at a predetermined position as illustrated in FIG. 4B. In the battery pack 11a using the element tabs 150 in this way, a bending process that may cause displacement is unnecessary for the linear element lead wires 942 in the axial-type protection element 940 in its manufacturing process. In addition, since the first protrusion 152 is properly disposed at a predetermined position along the side surface shape of each cell (910L, 910M, 910R), the external shape and dimension of the battery pack 11a become uniform. The power supply lead wire 931 can be attached to the second protrusion 153, and it is not necessary to provide a separate tab for attaching the power supply lead wire 931. That is, the number of parts can be decreased, and thus it becomes possible to reduce manufacturing cost of the battery pack 11a. Needless to say, even if the outer diameter of each cell (910L, 910M, 910R) is small, the power supply lead wire 931 can be reliably attached thereto.

Figure 5A:
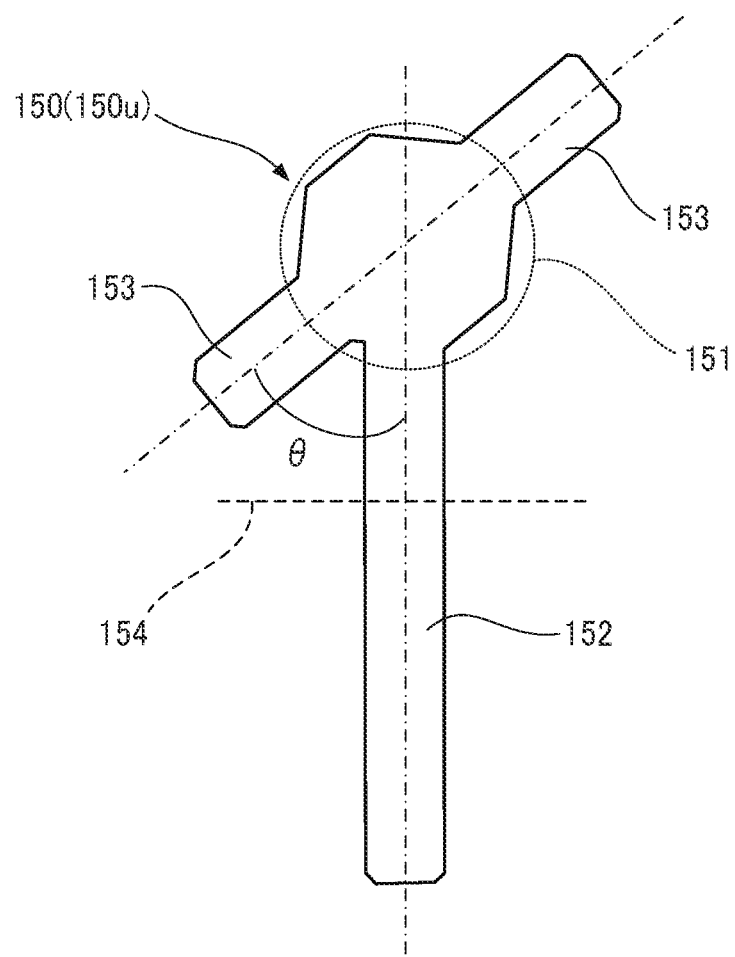
FIG. 5A illustrates a bending position of the aforementioned protection element attachment tab in the battery pack associated with the aforementioned working example of the first embodiment.
Figure 5B:
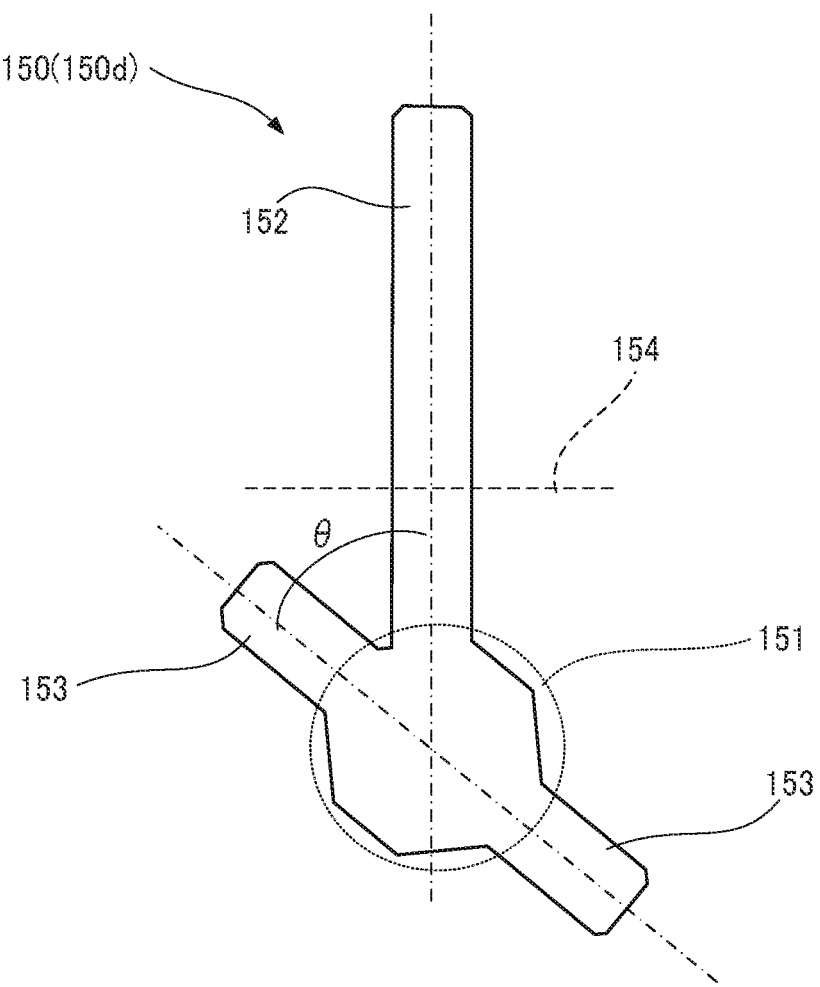
FIG. 5B illustrates a bending position of the aforementioned protection element attachment tab in the battery pack associated with the aforementioned working example of the first embodiment.

As illustrated in FIG. 5A and FIG. 5B, by bending the first protrusions 152 of the element tabs (150u, 150d) facing each other in the up-down direction, at a predetermined bending position 154 shown by a dotted line in the drawings, when the element tabs (150u, 150d) are attached to the positive and negative electrode terminals (912, 911) of each cell (910L, 910M, 910R), it is only necessary to position each element tab so as to allow an area on the leading end from the bending position 154 of the first protrusion 152 to be along the side surface of each cell (910L, 910M, 910R). Further, the element lead wire 942 of the protection element 940 can also be attached in advance. In the illustrated element tab 150, the second protrusions 153 protrude in mutually opposite directions with respect to the attachment part 151, and one of the second protrusions 153 intersects with the protruding direction of the first protrusion 152 at a predetermined angle θ. Then, when the protruding direction of the second protrusions 153 is allowed to match with the front-back direction orthogonal to the arrangement direction of the cells (910L, 910M, 910R), the first protrusion 152 automatically extend in a predetermined direction.

Other Working Examples

The planar shape of the element tab 150 is not limited to the shape illustrated in the working examples, and appropriate planar shapes may be applicable, for example, such that one first protrusion 152 and one second protrusion 153 may be formed, or three second protrusions 153 may be formed. In any case, as long as one first protrusion 152, which bends in the middle of its extension in a direction along the side surface of the cell 910, and other second protrusion 153 protrude in a direction intersecting with each other, such a planar shape may be applicable. Needless to say, not only the power supply lead wire 931, but also such as a signal line connected to an external voltage monitor or the like and various sensor parts attached to the battery pack 11a can be attached to the second protrusions 153. The protection element 940 is not also limited to diode, and any element such as PTC or fuse may be applicable as long as it has a function to prevent overdischarge. In any case, it is sufficient if the protection element 940 is an axial-type protection element 940.

Figure 6:
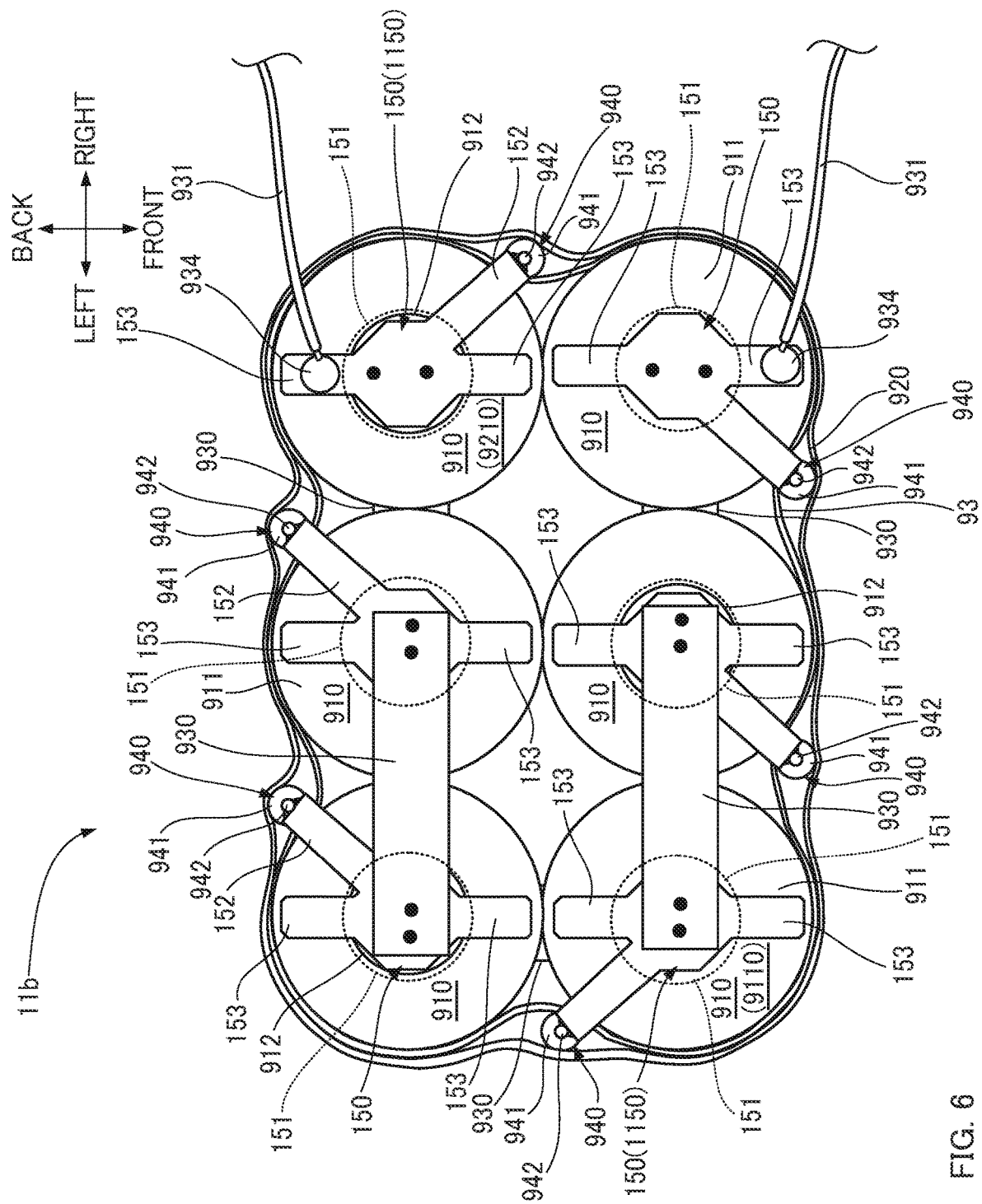
FIG. 6 illustrates a configuration of the battery pack associated with another working example of the first embodiment in the present disclosure.

Although the three cells (910L, 910M, 910R) are disposed in a row in the right-left direction in the battery pack 11a associated with the aforementioned working example, the cells may be disposed in two rows. FIG. 6 illustrates an example of a battery pack 11b configured with six cells 910 arranged in parallel in three columns and two rows. Here, FIG. 6 is a plan view when the battery pack 11b is seen from above. In FIG. 6, the planar shape of each element tab 1150 attached to a left-front side cell 9110 and a right-back side cell 9210 is a planar shape which serves as obverse and reverse relation with respect to the other element tabs 150.

Second Embodiment

===Parallel Fixing Component===

Figure 7:
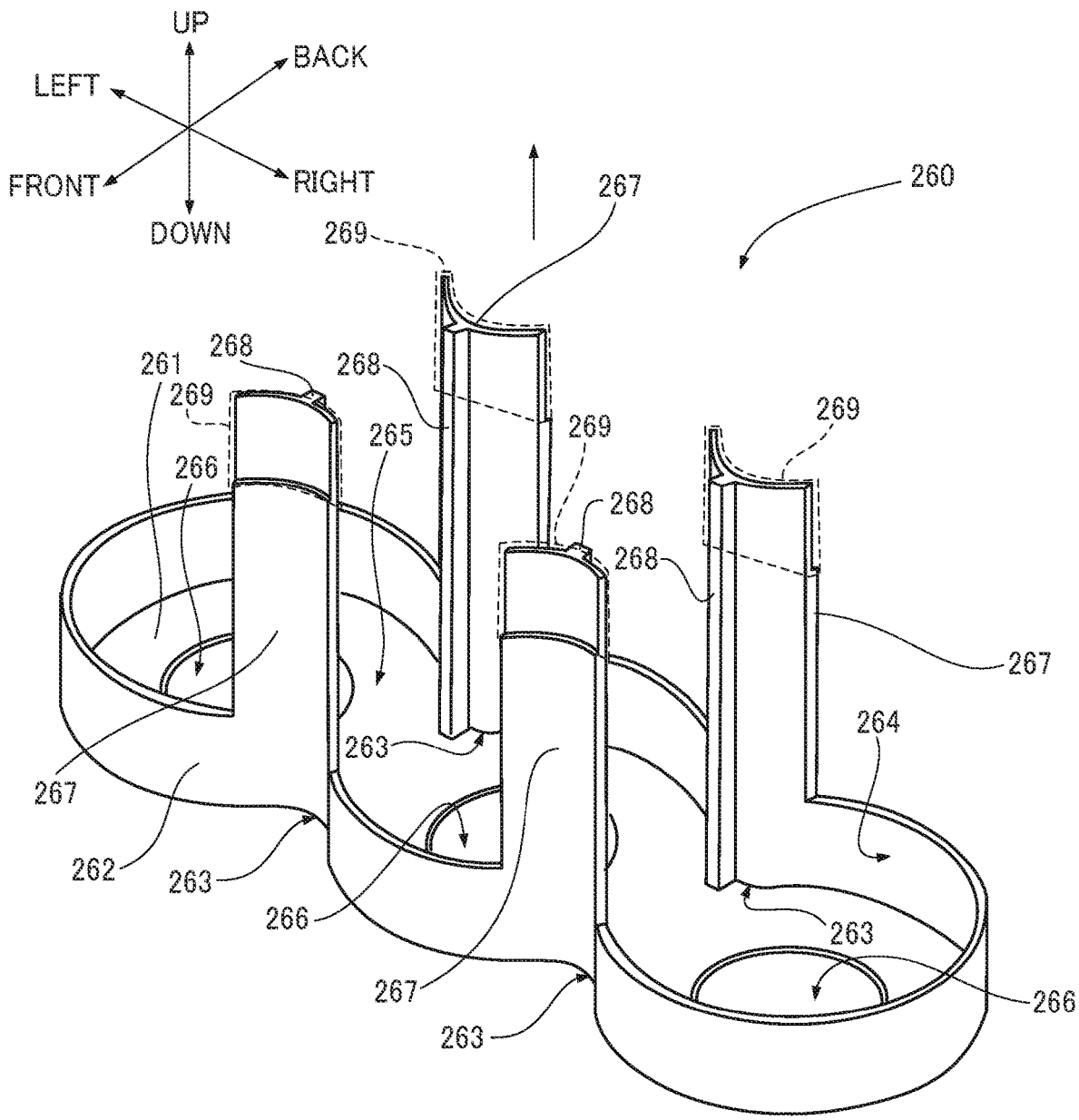
FIG. 7 illustrates a configuration of a parallel fixing component associated with the first working example of a second embodiment in the present disclosure.

As a first working example of a second embodiment in the present disclosure, an arrangement fixing component for collectively fixing the three cylindrical cells (910L, 910M, 910R) disposed in parallel will be described. FIG. 7 illustrates a schematic configuration of a parallel fixing component 260 associated with the present working example. The parallel fixing component (hereinafter, also referred to as a fixing component 260) described here is a bottomed cap-shaped component to be collectively attached to the three cylindrical cells (910L, 910M, 910R) disposed in parallel. Note that, in the following drawings, the directions of "up-down", "right-left" and "front-back" are each defined in the same manner as in FIG. 2A and FIG. 2B.

Although only one fixing component 260 is illustrated in FIG. 7, the fixing component 260 is used in pairs in one battery pack and mounted on the both upper and lower end surfaces of the battery pack. The fixing component 260 illustrated in FIG. 7 adapts to a state when it is mounted on the lower end surface of the battery pack. The fixing component 260 is an integrated molded article made of resin and includes a bottom 261 having a planar shape that includes end surface shapes of the three cylindrical cells (910L, 910M, 910R) disposed in parallel on the left and right, and a barrel portion 262 formed by a wall surface having a predetermined height, the wall surface standing around the bottom 261. Specifically, in a state illustrated in FIG. 7, the bottom 261 has a planar shape formed by continuously arranging v-shaped groove areas 960 through recessed portions 263, the V-shaped groove areas 960 each being formed between the cells (910L-910M, 910M-910R) and allowing three circles corresponding to the end surface shapes of the three cylindrical cells (910L, 910M, 910R) disposed in parallel on the left and right to be mutually adjacent. In this example, the recessed portions 263 each have a round groove shape and allow the aforementioned V-shaped groove areas 960 to be smoothly continued. The barrel portion 262 is formed by the wall surface standing upwardly around the bottom 261 while maintaining the planar shape of the bottom 261. In the fixing component 260 illustrated in FIG. 7, the lower ends of the three cells (910L, 910M, 910R) are collectively inserted to a space formed by an inner surface 264 of the barrel portion 262 and an upper surface 265 of the bottom 261. Note that, the size of the fixing component 260 is set so that the cells (910L, 910M, 910R) are inserted in a press-fitted state.

Furthermore, the bottom 261 is provided with opening portions 266 for allowing the electrode terminals (912, 911) of the three cells (910L, 910M, 910R) to be exposed outward. In addition, at positions corresponding to the recessed portions 263 of the bottom 261 in the barrel portion 262, protruding piece portions 267 extending upward (that is, in the height direction in which the wall surface stands) are formed while maintaining the planar shapes of the recessed portions 263. Note that, in the fixing component 260 described here, ribs 268 each extending from a leading end to the upper surface 265 of the bottom 261 are formed at the inner side of the protruding piece portions 267, and the protruding piece portions 267 are reinforced by those ribs 268 so as not to be easily bent. Further, the protruding piece portions 267 each include an area 269 in which the outer surface on the leading end is molded into a stepped shape so as to extend inward, and thus the leading end is made thin with respect to the base end.

Second Working Example

Figure 8A:
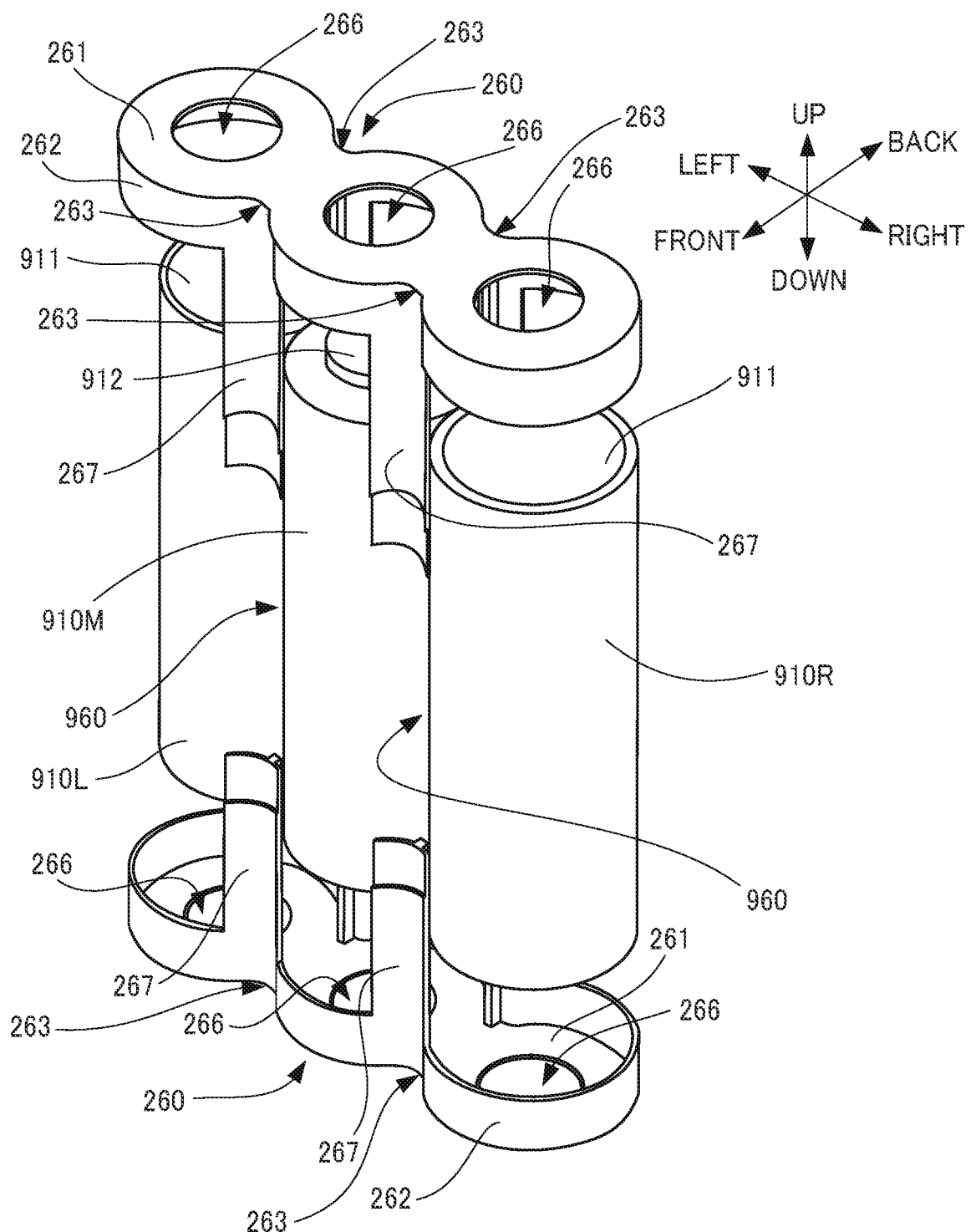
FIG. 8A illustrates a configuration of the battery pack associated with a second working example of the second embodiment in the present disclosure.
Figure 8B:
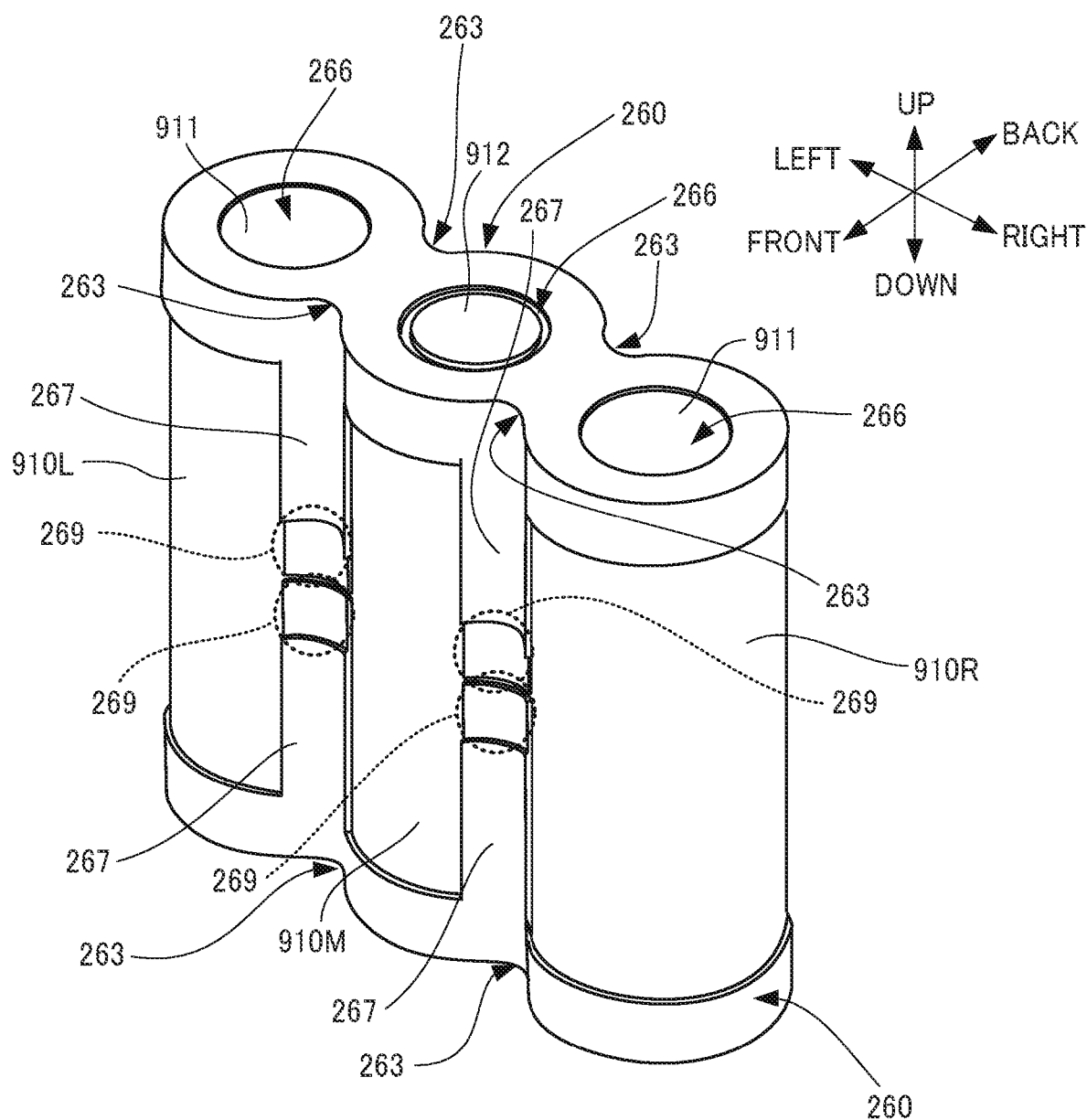
FIG. 8B illustrates a configuration of the battery pack associated with the second working example of the second embodiment in the present disclosure.

A second working example of the second embodiment in the present disclosure is a battery pack 21a using the fixing component 260 associated with the aforementioned first working example. FIG. 8A to FIG. 8D each illustrate the battery pack 21a associated with the second working example. Here, an assembling procedure of the battery pack 21a is illustrated in FIG. 8A to FIG. 8D. First, as illustrated in FIG. 8A, two fixing components (260-260) are set opposite each other in the up-down direction so as to allow the respective leading ends of the protruding piece portions 267 to be opposed, and the three cells (910L, 910M, 910R) are disposed in parallel between the two fixing components (260-260). Then, as illustrated in FIG. 8B, the fixing components 260 are fitted in the upper and lower end surfaces of the cells (910L, 910M, 910R). Accordingly, the cells (910L, 910M, 910R) are fixed in a parallel state while maintaining a correct relative positional relationship. Then, the electrode terminals (911, 912) of each cell (910L, 910M, 910R) are exposed from the opening portions 266 of the bottoms 261 of the fixing components 260, and each of the protruding piece portions 267 is disposed in each of the V-shaped groove areas 960 between the adjacent cells (910L-910M, 910M-910R). The respective leading ends of the protruding piece portions 267 of the upper and lower fixing components 260 are closely opposed. In other words, the height from the bottom 261 of the fixing component 260 to the leading ends of the protruding piece portions 267 is approximately half the length of the battery can of each cell (910L, 910M, 910R) in this example.

Figure 8C:
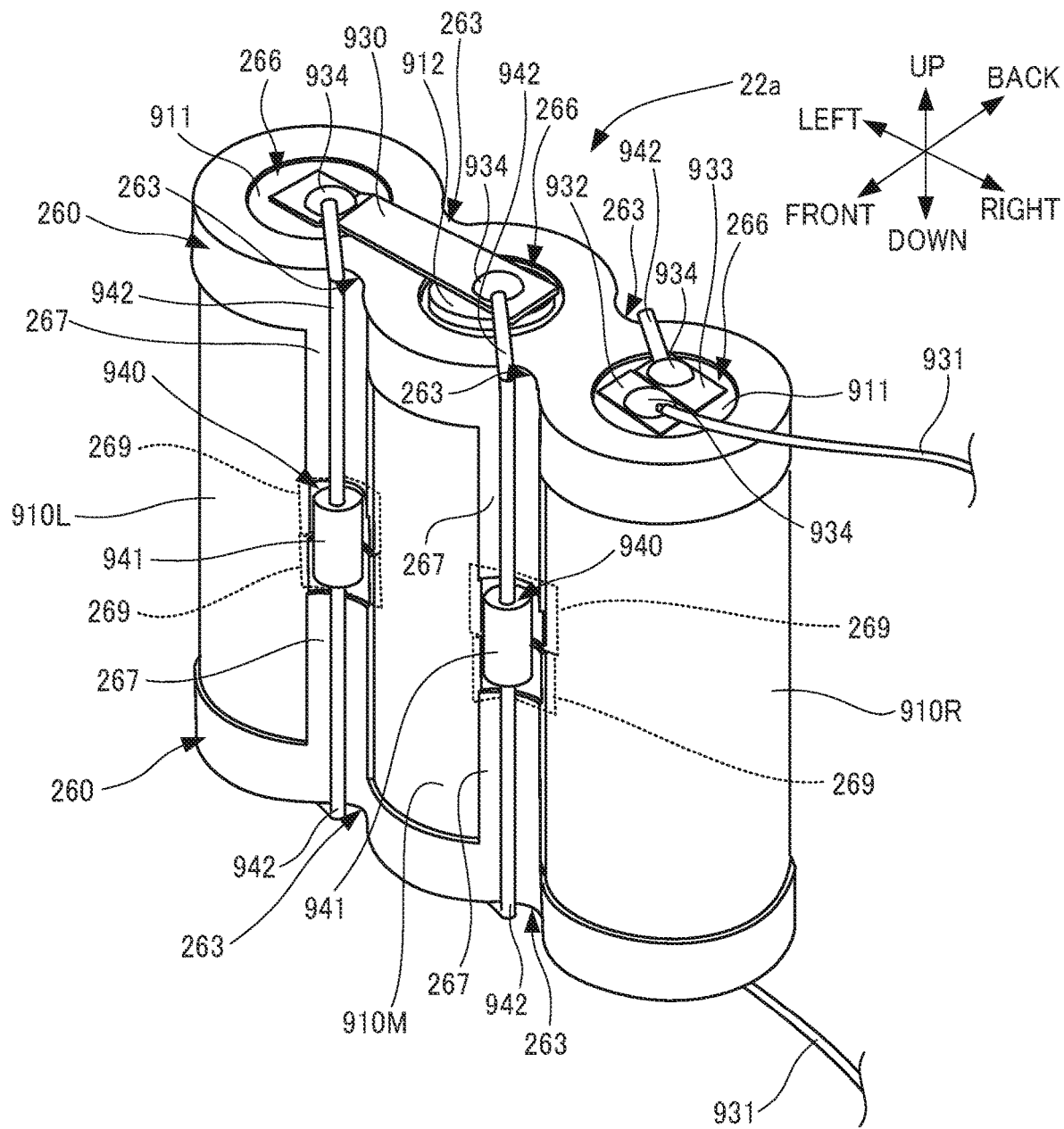
FIG. 8C illustrates a configuration of the battery pack associated with the second working example of the second embodiment in the present disclosure.
Figure 8D:
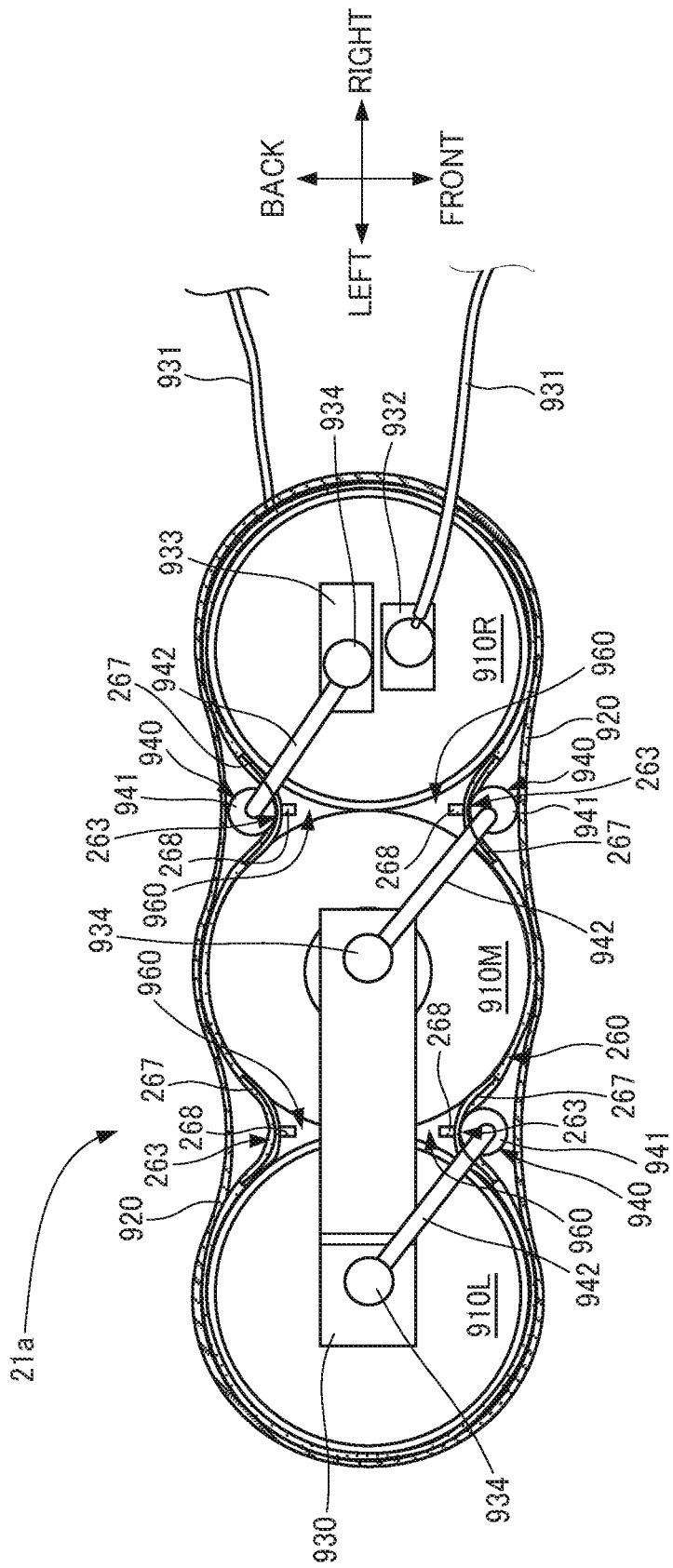
FIG. 8D illustrates a configuration of the battery pack associated with the second working example of the second embodiment in the present disclosure.

After the three cells (910L, 910M, 910R) are fixed by the fixing components 260, various tabs (930, 932, 933) are attached to the electrode terminals (911, 912) of the cells (910L, 910M, 910R), which are exposed from the opening portions 266 of the bottoms 261 as illustrated in FIG. 8C, and then the element lead wires 942 of the protection elements 940 and the power supply lead wires 931 are each attached to the corresponding tabs (930, 932, 933). When the protection elements 940 are attached, the element lead wires 942 are bent so as to be along the extending direction of the protruding piece portions 267, and then both ends of the element lead wires 942 are attached to predetermined tabs (930, 933) by solder 934. Accordingly, the body 941 of the protection element 940 of enlarged diameter conforms to the shape of the recessed portion 263, so that the element body 941 is kept from markedly protruding in the front-back direction with respect to each cell (910L, 910M, 910R). In addition, the leading end of each of the protruding piece portions 267 is a thin-walled area (hereinafter, also referred to as a thin-walled portion 269), and the element body 941 is disposed along the thin-walled portion 269, thereby further suppressing the protrusion of the element body 941 in the front-back direction. After the battery pack body 22a is assembled in this way, the battery pack body 22a is covered with the battery pack jacket 920 made of a heat-shrinkable tube to complete the battery pack 21a. FIG. 8D is a plan view when the battery pack 21a is seen from above. Each body 941 of the protection element 940 is disposed along the outer surface shape of the round groove shape of the protruding piece portion 267 of the fixing component 260, and the front-back and right-left side surfaces of the battery pack 21a is molded into a shape that allows the outer periphery of the cells (910L, 910M, 910R) disposed in parallel to be smoothly continued. In other words, there is no unnecessary protruded area caused by the thickness of the element body 941 on the outer surface of the battery pack jacket 920, and the external dimension of the battery pack 21a is restricted to a required minimum. In the battery pack 91, the shape of the cells (910L, 910M, 910R) disposed in parallel is maintained by using deformable adhesive tape 93 before the protection elements 940 are attached, whereas in the battery pack 21a associated with the second working example of the present embodiment, the cells (910L, 910M, 910R) are collectively fixed by using the fixing components 260 formed of an integrated molded article made of resin, which is hardly deformed. Each element body 941 is also disposed along the outer surface of the protruding piece portion 967 which is hardly deformed. Thus, even when the battery pack jacket 920 made of a heat-shrinkable tube is covered on the battery pack body 22a, the shape of the battery pack body 22a does not deform, and this allows unevenness in external shape and dimension of the battery pack 21a to be extremely reduced. Furthermore, since the element lead wires 942 of the protection element 940 extend along the protruding piece portions 267, the cell jacket (not shown) of the cells (910L, 910M, 910R) can be reliably protected from the heat of the element lead wires 942. Also, the cell jacket (not shown) near the border between the end surface and side surface of each cylindrical cell (910L, 910M, 910R) is protected from the edge of the connect tab 930 by the outer bottom of the fixing component 260. In the battery pack 21a associated with the second working example of the present embodiment, it is also possible to reduce a cost of members such as strip-shaped insulating tape (in FIG. 2, reference number 94) in the battery pack 91 and a ring-shaped insulator (in FIG. 2, reference number 95), and a cost of process of attaching these members 94 and 95.

Third Working Example

In the battery pack 91, when the axial-type protection elements 940 are attached, a process of bending the element lead wires 942 of the protection elements 940 is required. The protection elements 940 are each configured so that the element lead wires 942 are guided to both ends of the element body 941, and the leading ends of the element lead wires 942 are soldered through the tabs (930, 933) on the end surfaces on which the electrode terminals (911, 912) are disposed in the cell 910. In other words, each element lead wire 942 is bent in the middle of its extension in a direction along the side surface from the end surface of the cell 910. Accordingly, unless the bending shape of each element lead wire 942 and accuracy when the leading ends of the element lead wires 942 are attached to the tabs (930, 933) are strictly managed to a certain extent, a displacement occurs in the attachment position of the protection elements 940 and the arrangement of the element bodies 941. The displacement of the protection elements 940 leads to unevenness in external shape and dimension of the battery pack 91. Further, it is necessary to attach the tabs (932, 933) or the connecting tab 930 corresponding to the protection element 940 and the power supply lead wire 931 respectively to the areas of the electrode terminals (911, 912) of the cell 910 which are limited and narrow. When the outer diameter of the cell 910 is small, it becomes difficult to attach the tabs (932, 933) corresponding to the protection element 940 and the power supply lead wire 931, respectively. For this reason, a battery pack also having a structure capable of preventing a displacement when the axial-type protection elements 940 are attached is exemplified as a third working example of the present embodiment.

Figure 9:
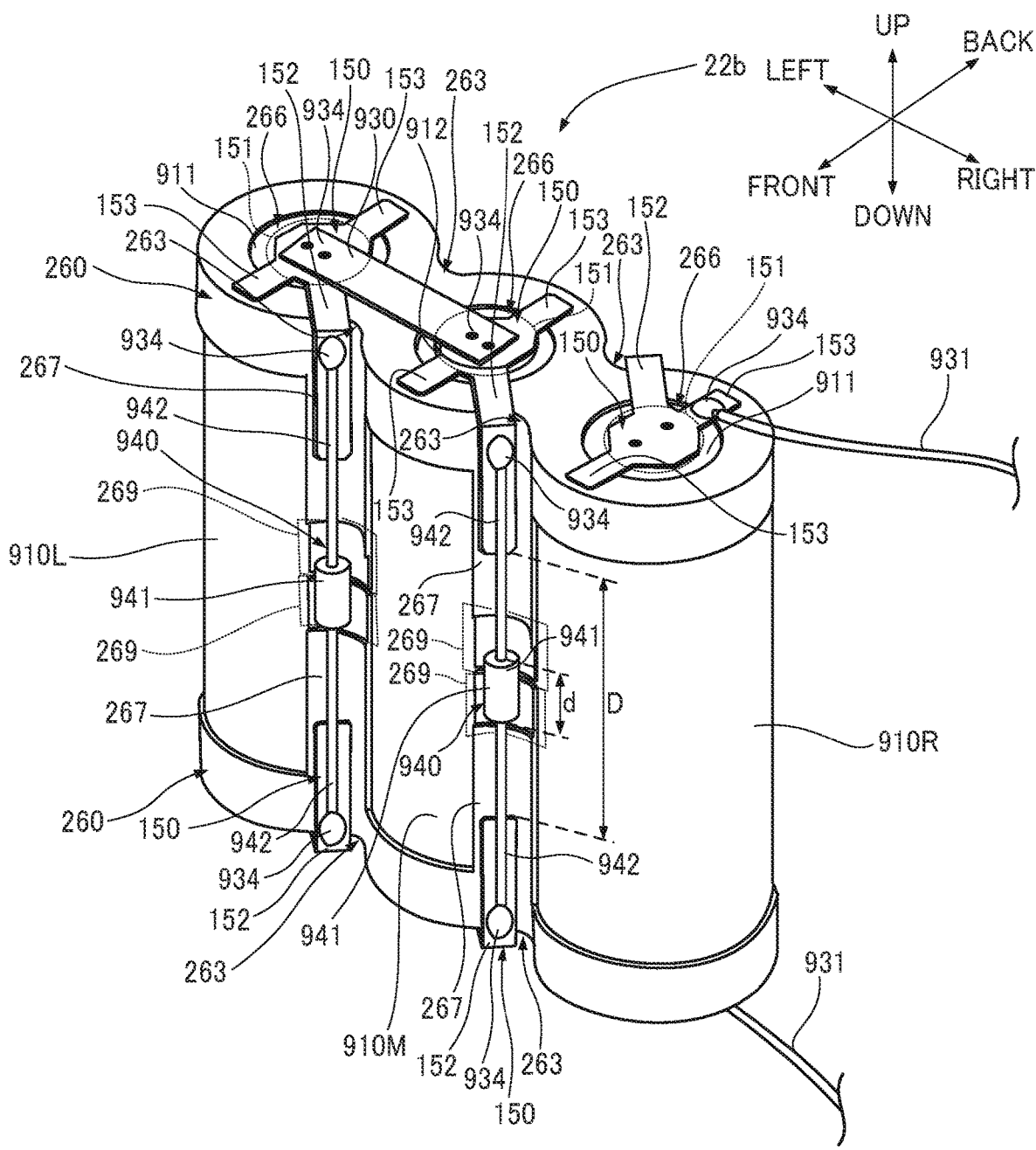
FIG. 9 illustrates a configuration of the battery pack associated with a third working example of the second embodiment in the present disclosure.

FIG. 9 is a drawing for explaining a schematic configuration of a battery pack 21b associated with the third working example of the present embodiment. Here, FIG. 9 illustrates a perspective view when the battery pack body 22b to which an exterior tube is not mounted is seen from the left front upper side. As illustrated in FIG. 9, the battery pack 21b associated with the third working example is configured to include the element tabs 150. The element tabs 150 are each made of a single flat metal plate, and are attached to the positive and negative electrode terminals (911, 912) of each cell (910L, 910M, 910R) by welding or the like. Then, power supply lead wires 931 and element lead wires 942 of protection elements 940 are attached to the predetermined element tabs 150 by soldering or the like.

Each element tab 150, as illustrated in FIG. 3 and FIG. 9, includes a plurality of protrusions (152, 153) with respect to the attachment part 151 that is each attached to the electrode terminals (911, 912) of each cell (910L, 910M, 910R) by welding, one protrusion 152 is bent in the middle of its extension in the up-down direction along the protruding piece portion 267 of the fixing component 260. Each element tab 150 illustrated in FIG. 9 includes a long protrusion (first protrusion 152) and short protrusions (second protrusions 153), the second protrusions 153 protrude in mutually opposite directions from the hexagonal attachment part 151, and the first protrusion 152 protrudes in a direction intersecting with the second protrusions 153. Each element tab 150 is attached so that an extending direction of the second protrusions 153 is directed to the front-back direction, the first protrusion 152 extends toward a direction of the recessed portion 263 of the fixing component 260 and is bent in the middle of its extension in a direction along the protruding piece portion 267. The first protrusions 152 of the respective element tabs 150 attached to the electrode terminals (911, 912) of the upper and lower ends of each cell (910L, 910M, 910R) extend along the protruding piece portions 267 and their leading ends face each other with a predetermined gap. The vertical length D of this gap is larger than the vertical length d of the body 941 of the protection element 940. The protection element 940 is disposed in the gap, and the element lead wires 942 are attached to the first protrusions 152 by soldering, welding or the like without being bent. In this example, the element lead wires 942 are attached by the solder 934.

By covering the battery pack body 22b configured in this way with the battery pack jacket 920, the battery pack 21b associated with the third working example is configured. In the battery pack 21b associated with the third working example, a process performing a bending process which causes displacement is unnecessary with respect to the linear element lead wires 942 of the axial-type protection element 940. In addition, the power supply lead wire 931 can be attached to the second protrusion 153, and it is unnecessary to separately provide the power supply lead tab 932 for attaching the power supply lead wire 931 and the element tab 933 for attaching the element lead wire 942. Consequently, the number of parts can be decreased, and it becomes possible to reduce manufacturing cost of the battery pack 21b.

Note that, in the element tab 150 of the third working example, the second protrusions 153 protrude in mutually opposite directions with respect to the attachment part 151, and the first protrusion 152 intersects with the protruding direction of one of the second protrusions 153 at the predetermined angle θ. This angle θ is set so that the first protrusion 152 automatically extends toward the area in which the protruding piece portion 267 is formed when the protruding directions of the second protrusions 153 are allowed to match with the front-back direction orthogonal to the arrangement direction of the cells 910. Alternatively, if a shallow groove having a rectangular cross-section along which the first protrusion 152 is placed is formed on the outer surface of the bottom 261 of the fixing component 260, the first protrusion 152 can correctly extend in a predetermined direction even if the arrangement direction of the cells 910 and the extending direction of the second protrusions 153 are not adjusted when each element tab 150 is attached to the electrode terminals (911, 912).

In general, the cylindrical cell 910 includes the projecting positive terminal 912 and the flat negative terminal 911, and the negative terminal 911 may not protrude outward from the bottom 261 of the fixing component 260 in some cases. In such a case, the first and second protrusions (152, 153) interfere with the edge of the opening portion 266 of the bottom 261 when the attachment part 151 of the element tab 150 is attached to each of the electrode terminals (911, 912). Thus, in response to such a case, the base ends of the first and second protrusions (152, 153) may be bent into a crank shape in advance. Accordingly, the first and second protrusions (152, 153) get over the edge of the opening portion 266 of the fixing component 260 and can be prevented from interfering with the edge of the opening portion 266 of the bottom 261. In any case, the element tab 150 made of a flat metal plate may be easily molded into any shape by pressing or the like in advance.

Other Working Example

In the aforementioned working examples, the protruding piece portions 267 of the fixing component 260 are formed so as to correspond to all of the V-shaped groove areas 960 between the adjacent cells (910L-910M, 910M-910R). However, any of the protruding piece portions 267 may be omitted as long as the number of protruding piece portions 267 is greater than or equal to the number of protection elements 940 that are attached to the battery packs 21a, 21b. Moreover, when a temperature sensor or the like on the surface of the cell 910 is stuck on the side surface of the cell 910 in the V-shaped groove area 960, only the protruding piece portion 267 corresponding to the sticking position may be omitted. Note that, as long as the protection element 940 has a function preventing overdischarge, the protection element 940 is not limited to diode, and may be, for example, PTC or fuse. In any case, it is sufficient that the protection element 940 is an axial-type protection element 940.

The element tab 150 of the third working example is not limited to the illustrated configuration, and may have a planar shape, for example, in which one first protrusion and one second protrusion (152, 153) are formed, or three second protrusions 153 may be included. In any case, it is only necessary that one first protrusion 152, which bends in the middle of its extension in a direction along the protruding piece portion 267 of the fixing component 260, and other second protrusion 153 protrude in a direction intersecting with each other. Needless to say, not only the power supply lead wire 931, but also such as a signal line connected to an external voltage monitor and various sensor parts attached to the battery packs 21a, 21b can be attached to the second protrusion 153.

Figure 10:
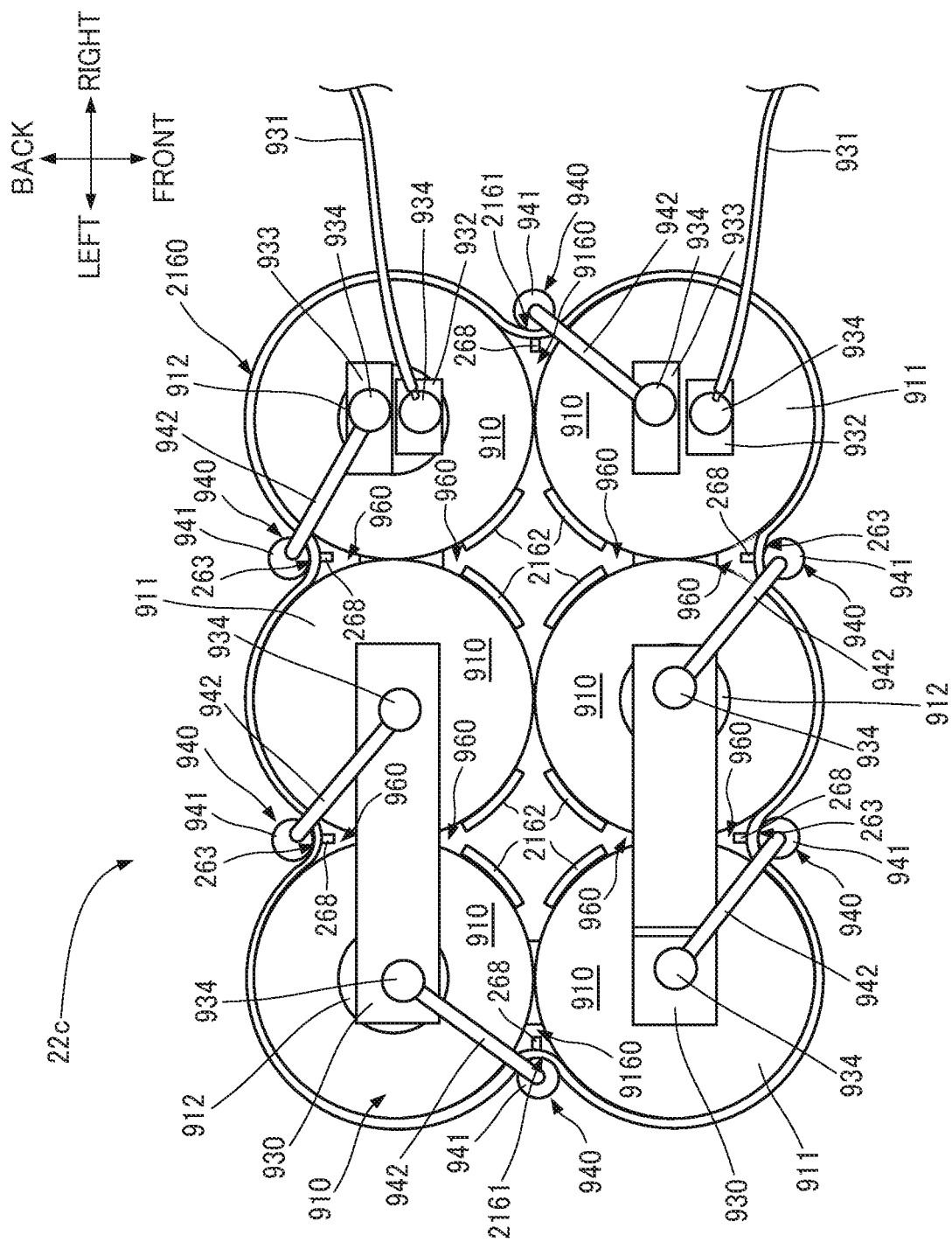
FIG. 10 illustrates a configuration of a parallel fixing component associated with another working example of the second embodiment in the present disclosure.

The fixing component 260 in the aforementioned working examples is configured so that the three cells (910L, 910M, 910R) disposed in parallel in a row in the right-left direction are held together. However, as long as the cells are disposed in parallel, the number of cells 910 may be two, or four or greater. In addition, the cells 910 included in the battery pack are not limited to one row, and they may be disposed in parallel in two rows. FIG. 10 is a plan view illustrating a battery pack 21c configured with six cells 910 arranged in parallel in three columns and two rows (hereinafter, 3×2) when the battery pack body 22c omitting the battery pack jacket 920 is seen from above. The fixing component 2160 is collectively mounted on the end surfaces of the cells 910 disposed in parallel in three columns and two rows, and V-shaped groove areas 9160 between the adjacent cells (910-910) in the front-back direction are also continuous by recessed portions 2161. In this example, arc-shaped wall surfaces 2162 standing upward (front side on the paper) are formed on the bottom 261, and thus the cells 910 are reliably held by the barrel portion 262 and these arc-shaped wall surfaces 2162.

As stated above, the present embodiment has been described. According to the present embodiment, dimensional accuracy of the battery packs 11a, 11b, 21a and 21b can be secured, and manufacturing cost can be reduced by decreasing the number of processes and parts. Thus, inexpensive battery packs 11a, 11b, 21a and 21b can be provided with no variation in external dimension.

According to the tabs 150, 1150 for attaching protection elements associated with the present embodiment, in manufacturing processes of the battery packs 11a and 11b formed as a single unit in a state in which a plurality of cylindrical cells 910 are disposed in parallel, dimensional accuracy can be secured, and manufacturing cost can be reduced by decreasing the number of processes and parts. Consequently, inexpensive battery packs 11a and 11b can be provided with no variation in external dimension.

Furthermore, according to the parallel fixing components 260, 2160 associated with the present embodiment, in manufacturing processes of the battery packs 21a, 21b configured to include a plurality of cells 910 disposed in parallel, dimensional accuracy can be secured, and manufacturing cost can be reduced by decreasing the number of processes and parts. Thus, the inexpensive battery packs 21a, 21b can be provided with no variation in external dimension.

The foregoing embodiments facilitate understanding of the present disclosure and do not intend to limit the interpretation of the present disclosure. Variations and modifications may be made in accordance with the spirit and scope of the present disclosure and equivalents thereof are included in the present disclosure.

What is claimed is:

1. A protection element attachment tab made of a single flat metal plate,
the protection element attachment tab being mounted on each of positive and negative electrode terminals of a cylindrical cell to connect between the positive electrode terminal formed on one end surface of the cell and the negative electrode terminal formed on another end surface of the cell with a protection element that prevents overdischarge between the electrode terminals,
the protection element attachment tab comprising:
a planar region facing the end surface of the cell when mounted on the electrode terminal of the cell;
a first protrusion protruding from the planar region in a direction along the planar region and having a length so that a leading end of the first protrusion protrudes outward from the end surface of the cell when the planar region is mounted on the electrode terminal; and
a second protrusion protruding from the planar region in a direction different from the first protrusion along the planar region and being shorter than the first protrusion.

2. A battery pack comprising:
a plurality of cylindrical cells disposed in parallel;
a protection element including a body and a pair of element lead wires extending from the body to one side and another side, the protection element preventing overdischarge between a positive electrode terminal formed on one end surface of each cell of the plurality of cells and a negative electrode terminal formed on another end surface of each cell of the plurality of cells; and
protection element attachment tabs made of a single flat metal plate, the protection element attachment tabs being mounted on respective positive and negative electrode terminals to connect between the positive electrode terminal and the negative electrode terminal of each cell of the plurality of cells with the protection element,
the protection element attachment tabs each including:
a planar region facing the end surface when mounted on the electrode terminal of each cell of the plurality of cells;
a first protrusion protruding from the planar region in a direction along the planar region and having a length so that a leading end of the first protrusion protrudes outward from the end surface of each cell of the plurality of cells when the planar region is mounted on the electrode terminal; and
a second protrusion protruding from the planar region in a direction different from the first protrusion along the planar region and being shorter than the first protrusion,
the first protrusion extending toward a V-shaped groove area formed between the cells adjacent each other and bending in a direction along a side surface of each cell of the plurality of cells,
a pair of the protection element attachment tabs each with first protrusions including leading ends that face each other across a gap larger than a length of the body of the protection element, the pair of protection element attachment tabs being attached to the positive electrode terminal and the negative electrode terminal of each cell of the plurality of cells, the body of the protection element being disposed in the gap, the pair of element lead wires being attached to areas in which the first protrusions of the pair of protection element attachment tabs extend along a side surface of each cell of the plurality of cells.

3. The battery pack according to claim 2, further comprising a pair of power supply lead wires for supplying electric power in an external circuit, wherein the pair of power supply lead wires is attached to the second protrusions of the protection element attachment tabs attached to a positive electrode terminal and a negative electrode terminal of an assembled battery formed by electrically connecting the plurality of cells constituting the battery pack.

4. Parallel fixing components for fixing a plurality of cylindrical cells constituting a battery pack in a state of being disposed in parallel, the parallel fixing components each having a bottomed cap-shaped and being mounted on both end surfaces of the plurality of cells, the parallel fixing components each including:

a bottom having a planar shape that includes a plurality of circles corresponding to shapes of end surfaces of the plurality of cells disposed in a parallel state and includes recessed portions so as to allow outlines of adjacent circles to be smoothly continued, the bottom including openings corresponding to electrode terminals formed on respective end surfaces of the plurality of cells disposed in the parallel state; and a barrel portion formed by a wall surface having a predetermined height provided to stand around the bottom while maintaining the planar shape of the bottom, the barrel portion including protruding piece portions that further extend in a direction of the height from the wall surface corresponding to positions of the recessed portions, the wall surface having recessed portions that bend inward along the side surfaces of the plurality of cells adjacent each other.

5. The parallel fixing components according to claim 4, wherein the protruding piece portions are each molded into a stepped shape in which an outer surface on a leading end extends inward, and the leading end is made thin with respect to a base end.

6. A battery pack comprising:

a plurality of cylindrical cells;

a protection element including a body and a pair of element lead wires extending to one side and another side from the body, the protection element preventing overdischarge between a positive electrode terminal formed on one end surface of each cell of the plurality of cells and a negative electrode terminal formed on another end surface of each cell of the plurality of cells;

the parallel fixing components according to claim 4;

a connecting tab electrically connecting the plurality of cells in series or in parallel; and a jacket that covers the plurality of cells, the parallel fixing components, the connecting tab and the protection element, the protruding piece portions of a pair of the parallel fixing components attached to both end surfaces of the plurality of cells including leading ends that face each other in a V-shaped groove area formed between the cells adjacent each other, the connecting tab being attached between predetermined electrode terminals of the plurality of cells exposed outward through the openings of the bottom, the body of the protection element being along the protruding piece portions and being disposed in an area extending across a facing position of leading ends of the protruding piece portions, the pair of element lead wires being along an extending direction of the protruding piece portions and being connected to the positive electrode terminal and the negative electrode terminal, respectively.

7. The battery pack according to claim 6, further comprising protection element attachment tabs each being made of a single flat metal plate and being mounted on the electrode terminals to connect between the positive electrode terminal and the negative electrode terminal of each cell of the plurality of cells with the protection element, wherein the protection element attachment tabs each including:

a planar region facing the end surface when mounted on the electrode terminal of each cell of the plurality of cells;

a first protrusion protruding from the planar region in a direction along the planar region and having a length so that a leading end of the first protrusion protrudes outward from the end surface of each cell of the plurality of cells when the planar region is mounted on the electrode terminal; and a second protrusion protruding from the planar region in a direction different from the first protrusion along the planar region and being shorter than the first protrusion, the first protrusion extending toward the recessed portion and bending in a direction along the protruding piece portion, a pair of the protection element attachment tabs each with first protrusions including leading ends that face each other across a gap larger than a length of the body of the protection element, the pair of protection element attachment tabs being attached to the positive electrode terminal and the negative electrode terminal of each cell of the plurality of cells, the body of the protection element being disposed in the gap, the pair of element lead wires being attached to areas in which the first protrusions of the pair of protection element attachment tabs extend along the protruding piece portions.

8. The battery pack according to claim 7, further comprising a pair of power supply lead wires for supplying electric power to an external circuit, wherein the pair of power supply lead wires is attached to the second protrusions of the protection element attachment tabs respectively attached to a positive electrode terminal and a negative electrode terminal of an assembled battery formed by electrically connecting the plurality of cells constituting the battery pack.

* * * * *